United States Patent [19]

Jackson et al.

[11] Patent Number: 4,821,217

[45] Date of Patent: Apr. 11, 1989

[54] PROGRAMMABLE JET ENGINE TEST STATION

[75] Inventors: Brian K. Jackson, Lynnwood; Joel D. Wilson, Kent, both of Wash.

[73] Assignee: The Boeing Company, Seattle, Wash.

[21] Appl. No.: 2,413

[22] Filed: Jan. 12, 1987

[51] Int. Cl.[4] .................... G06F 15/20; G06F 15/36; G01M 15/00

[52] U.S. Cl. ............................... 364/551.01; 73/117.2

[58] Field of Search ............... 364/550, 551, 579, 580, 364/900; 73/116, 117.2, 117.3

[56] References Cited

U.S. PATENT DOCUMENTS

| | | | |
|---|---|---|---|
| 3,300,785 | 1/1967 | Richardson et al. | 346/17 |
| 3,485,093 | 12/1969 | Muller et al. | 73/116 |
| 3,630,076 | 12/1972 | Staudt | 73/117.3 |
| 3,731,070 | 5/1973 | Urban | 364/580 |
| 3,946,364 | 3/1976 | Codomo et al. | 364/900 |
| 4,116,052 | 9/1978 | Paluka | 73/117.3 |
| 4,128,005 | 12/1978 | Arnston et al. | 73/117.3 |
| 4,135,246 | 1/1979 | McMannis | 364/551 |
| 4,158,884 | 6/1979 | McKinley et al. | 364/580 X |
| 4,159,531 | 6/1979 | McGrath | 364/900 |
| 4,215,412 | 7/1980 | Bernier et al. | 364/551 |
| 4,280,185 | 7/1981 | Martin | 364/506 |
| 4,361,870 | 11/1982 | D'Agostini et al. | 364/424 |
| 4,375,672 | 3/1983 | Kato et al. | 364/551 |
| 4,389,710 | 6/1983 | Rasmussen | 364/580 X |
| 4,502,324 | 3/1985 | Marino et al. | 73/117.3 |
| 4,551,801 | 11/1985 | Sokol | 364/580 X |
| 4,557,141 | 12/1985 | Poirier et al. | 73/117.2 |
| 4,670,847 | 6/1987 | Furuse | 364/580 X |
| 4,677,581 | 6/1987 | Malka et al. | 364/580 X |
| 4,701,867 | 10/1987 | Brüggemann | 364/580 X |

OTHER PUBLICATIONS

Lawrence et al.: Programmable Engine Trim Set (TRIM), Conference IEEE Autotestcon 1981, Orlando, Fl., Oct, 81, pp. 172-175.

Lawley et al.: ASTF Test Instrumentation System, Conference ICIASF 1979 Record Internat. Congress, Instrumentation in Aerospace Simulation Facilities Monterey, CA, Sep. 79, pp. 86-96.

*Primary Examiner*—Felix D. Gruber
*Attorney, Agent, or Firm*—Bruce A. Kaser

[57] ABSTRACT

A programmable test station automatically performs static tests of electrical and pneumatic systems of jet aircraft engines. The test station automatically stimulates the systems to be tested on each engine and measures their response. A programmable data acquisition computer controls both stimuli and measurement, and generates data. The station is operatively connected to a plurality of engines simultaneously and tests certain systems on each in accordance with station user commands. The station includes a voice generator which permits the computer to "speak" to the station user for the purpose of receiving instructions and for communicating instruction acknowledgements and requests.

6 Claims, 12 Drawing Sheets

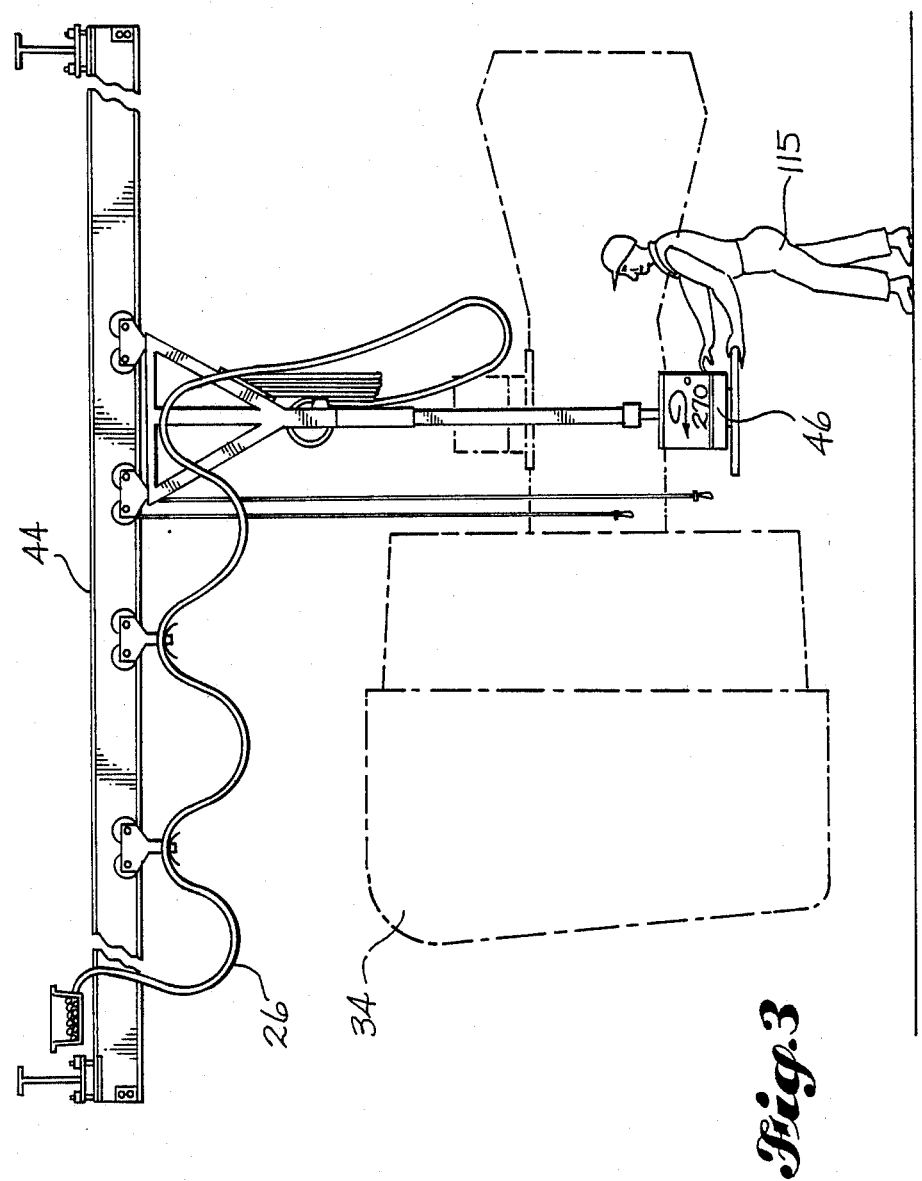

Fig. 4

| Column 1 | Column 2 | Column 3 | Column 4 |
|---|---|---|---|
| 400 X 1 MATRIX ENCLOSURE | | | ACCESSORY SERVICE PANEL |
| 400 X 1 MATRIX ENCLOSURE | SYSTEM POWER SUPPLY | BLANK | MODEM MODULES |
| 400 X 1 MATRIX ENCLOSURE | MATRIX CONTROL ASSEMBLY | AC POWER/SIGNAL MODULE | |
| 400 X 1 MATRIX ENCLOSURE | MATRIX DRIVE ASSEMBLY | DC POWER/SIGNAL MODULE | DATA COMMUNICATIONS DISC DRIVE |
| 400 X 1 MATRIX ENCLOSURE | PATCH PANEL | DC POWER MODULE INTERFACE | DATA ACQUISITION MONITOR MODULE |
| 400 X 1 MATRIX ENCLOSURE | | DIGITAL MULTIMETER MODULE | |
| 400 X 1 MATRIX ENCLOSURE | MATRIX ENCLOSURE | SYNCRO/RESOLVER SIMULATOR MODULE | |
| 400 X 1 MATRIX ENCLOSURE | MATRIX ENCLOSURE | API MODULE | DATA COMMUNICATIONS COMPUTER |
| GROUP SWITCH ENCLOSURE | ACCESSORY SERVICE PANEL#2 26P | CARD CAGE ASSEMBLY UPPER BAY 3 | KEYBOARD |
| GROUP SWITCH ENCLOSURE | BLANK | CARD CAGE ASSEMBLY UPPER BAY 3 | THERMAL PRINTER |
| GROUP SWITCH ENCLOSURE | | CAL/CERT SYSTEM CERTIFICATION MODULE AND SELF TEST | |
| GROUP SWITCH ENCLOSURE | BLANK | WIRE INTEGRITY TESTER MODULE | DATA ACQUISITION DISC DRIVE |
| BLANK | | BLANK | BLANK |

Column 3 additional labels (right side): STATION POWER MODULE, DIGITAL/CLOCK TIMER MODULE, DATA ACQUISITION MODULE, PNEUMATIC SUPPLY MODULE, VOICE GENERATOR

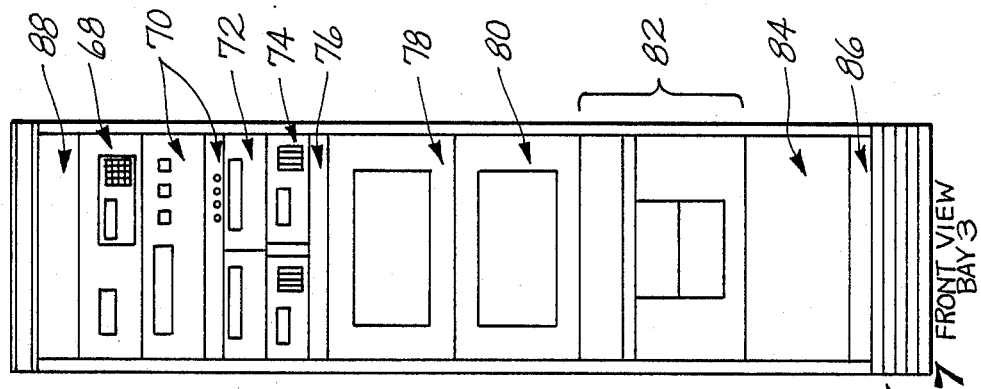
Fig. 7 FRONT VIEW BAY 3
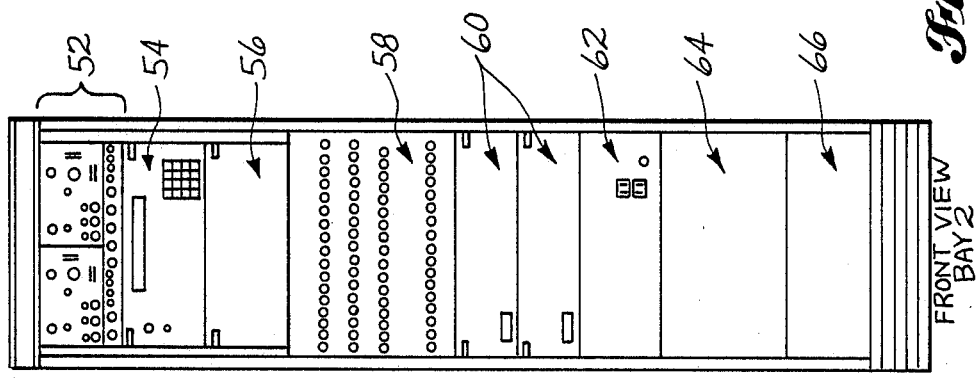
Fig. 6 FRONT VIEW BAY 2
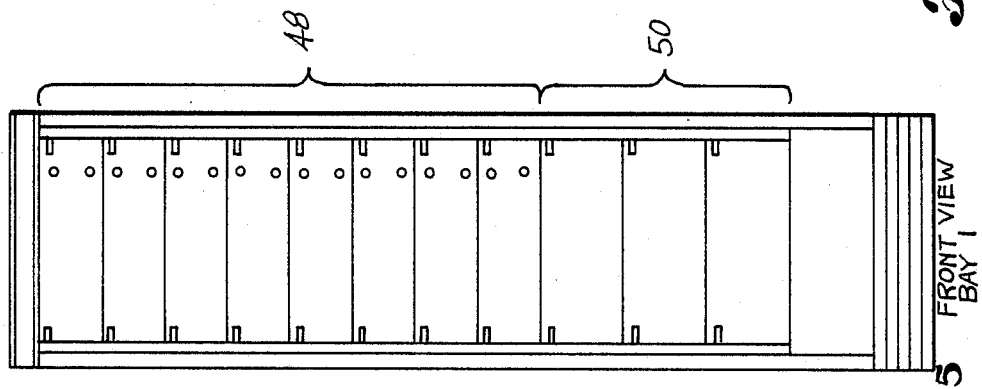
Fig. 5 FRONT VIEW BAY 1

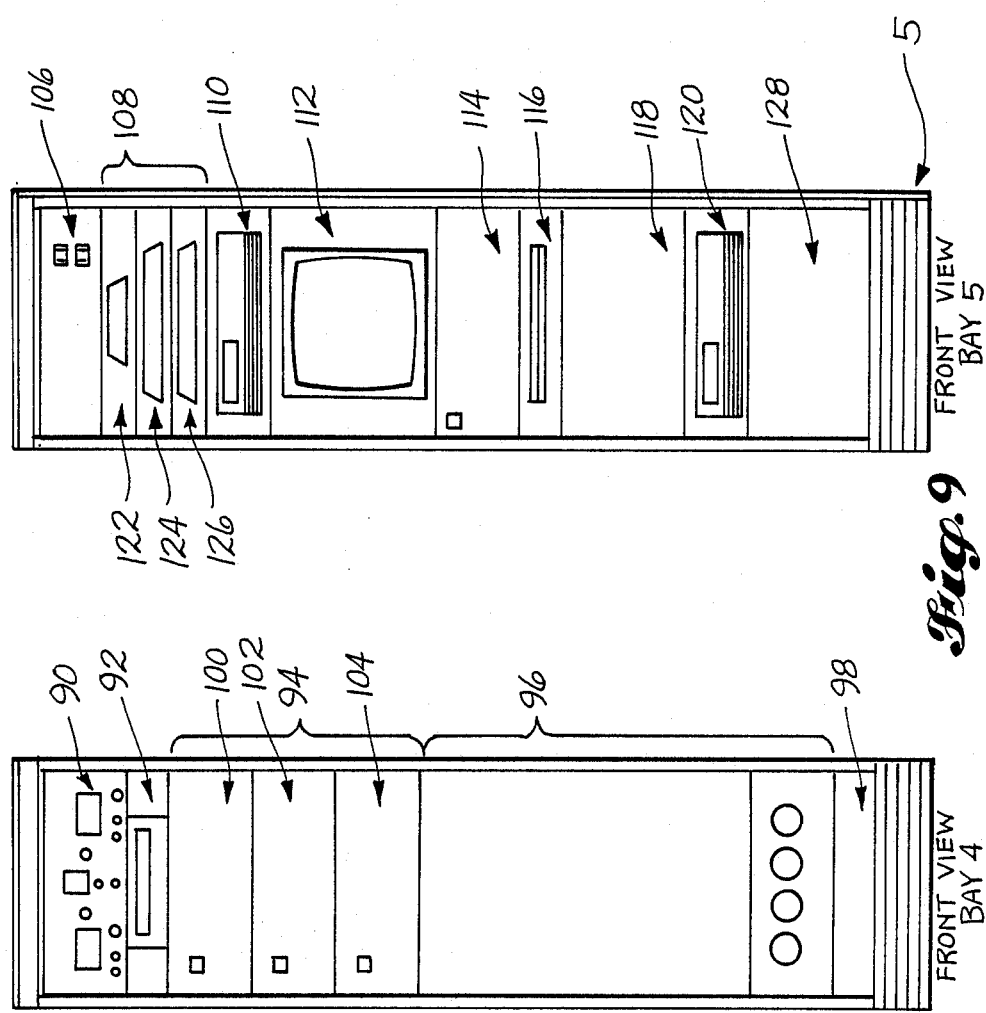

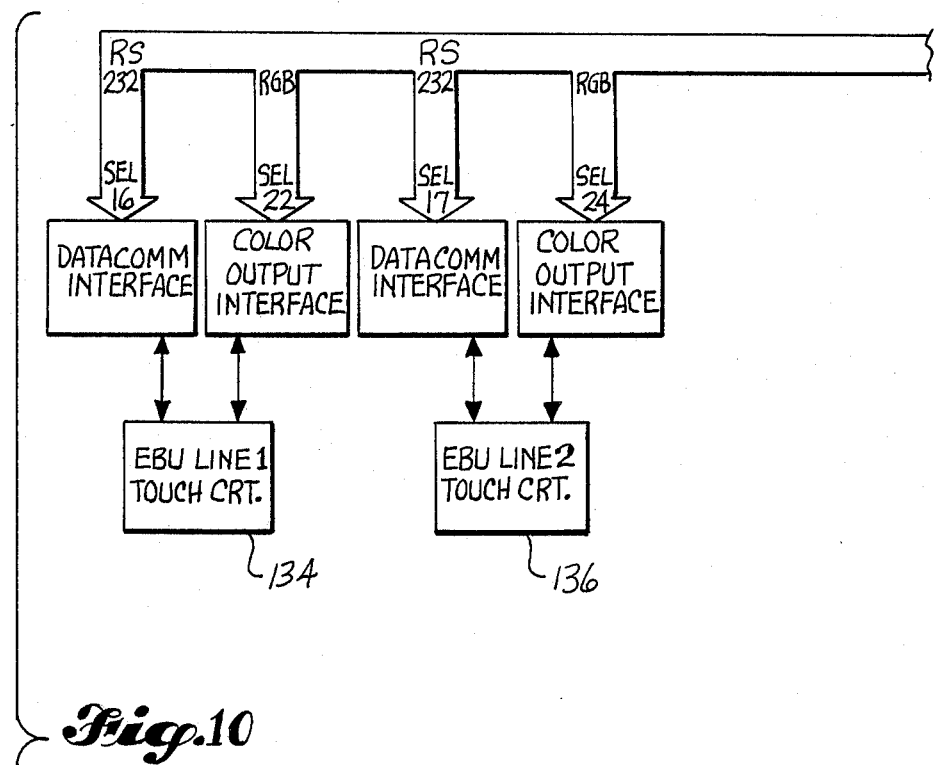
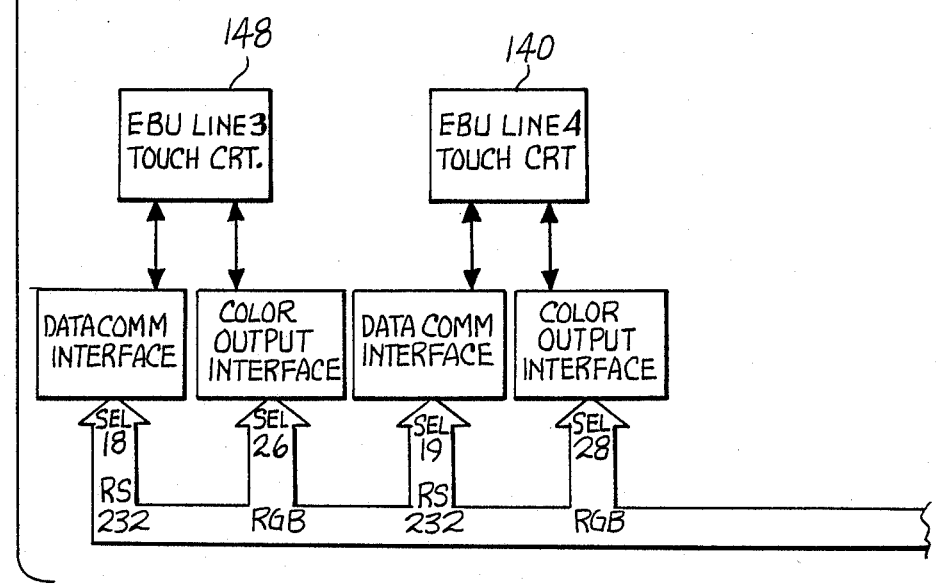
Fig. 10

PROGRAMMABLE JET ENGINE TEST STATION

TECHNICAL FIELD

This invention relates to devices that are used to test mechanical and electrical systems of engines. More particularly, it relates to devices that are used to test jet engines in a static, nonrotating mode.

BACKGROUND ART

Manufacturing an aircraft engine and performing maintenance on the same after it has been brought into service involves a significant amount of testing. As a person skilled in the art would know, such tests generally involve testing engine systems when it is in both an operational (engine fuel ignited, engine rotating) and nonoperational (no ignition, nonrotating) mode. As a practical matter, certain systems can only be tested while an engine is running. However, certain others can be tested when the engine is static, i.e. in a nonrotating mode. For example, virtually every present day commercial jet aircraft engine has certain electrical and pneumatic systems that can be tested on the ground while the engine is not running. It has been industry practice to fully test these systems upon engine build-up prior to its installation on an airplane They may also be tested after installation during periodic maintenance of the aircraft.

In the past, testing these systems has been a long and tedious process. Generally, they involved manually testing individual circuits and pneumatic lines, for the most part on a one-by-one basis. The usual procedure was for a technician to manually stimulate a system to be tested, such as placing voltage and current across an electrical circuit or putting air pressure into a pneumatic line, for example, and then measuring the circuit or line's response to the stimulation. Once one circuit or line had been tested, the technician would move on and test another. To test all static, non-rotating systems of a typical commercial jet aircraft engine in this manner generally required six to eight man-hours. The present invention is a system that provides fully automated testing and has reduced the man-hours required per engine test to approximately one hour. Implementation of the invention by an aircraft manufacturer or maintenance facility therefore provides the potential for realizing significant cost savings over the long term.

DISCLOSURE OF THE INVENTION

The present invention is a programmable engine test station usable to automatically test the static, nonrotating systems of a jet aircraft engine prior to the engine's installation on an aircraft or during periodic maintenance. It should be appreciated that the definition of static, non-rotating test in the instant case means all situations where the engine is in a noncombustion mode.

The station includes function stimuli means for providing electrical and pneumatic stimulus for certain conventionally known engine systems Specifically, the electrical stimulus is in the form of voltages (both AC and DC), currents and resistances which are applied to various circuits and like systems on the engine. The pneumatic stimulus includes providing air pressure to those systems which are either air-operated or, for example, provide or govern bleed air flow. Those systems stimulated electrically include oil pressure and fuel pressure transducers, PMC (power management control) computer, engine igniters and the EEC computer Systems stimulated pneumatically include air bleed valves, and air-operated starter and thermo/anti-ice valves. Certain solenoids in connection with these latter systems are also stimulated.

Each system stimulated thusly responds to the stimulus and such response is measured by the test station to indicate if the system's function is fully operational. A programmable data acquisition computer operatively connected to both the function stimuli means and the function measurement means is programmed to automatically control system stimuli and measurement, including generation of desired test stimuli and measurement of the response of the system tested thereto. The computer is further programmed to create or generate data that keeps track of both stimuli and measured response.

Preferably, the stimuli and measurement means are simultaneously connected to the electrical and pneumatic systems of each of a plurality of aircraft engines. The data acquisition computer is programmed to accept test instructions from a station user or operator that command the station to automatically carry out tests of particular user-selected electrical and pneumatic systems of a user-selected engine. The test station includes a plurality of remote communication terminals each being positionable adjacent a separate engine. Each terminal is operatively connected to the data acquisition computer, and is operable to receive station user instructions and to communicate such instructions to the data acquisition computer. The computer is further programmed to acknowledge such instructions and to request instructions, wherein such acknowledgements and requests are communicated by the remote terminal to the user. In this regard, the test station includes a voice generator for providing computer verbalization of acknowledgements and instruction requests in a manner which can be heard by the user. In other words, the test station literally "speaks" to the user. It requests from the user which tests the user wishes to carry out, and on which engine. Further, the station tells the user how to initiate or cause the station to implement such tests. Computer acknowledgements and instruction requests are audiblized at each remote communication terminal.

The test station includes a second computer for data communications. This computer is operatively connected to the data acquisition computer and acts as a data archive. It receives and stores data from remote locations positioned away from the test station.

The test station also includes its own calibration/certification module for providing station self-tests, to calibrate and certify the accuracy of the system functional tests performed by the station, and further includes a wire integrity tester module for performing integrity checks of a resident switch matrix system and harnesses, and arterial cables.

An advantage to the present invention is that it provides a user friendly automatic test station that requires no great amount of training to perform test functions.

A second advantage to the invention is that it provides for off-site development of application software and information flow.

A third advantage to the present invention is that it has eliminated various manual processes associated with manual stimulation and manual measurement to functionally test engine electrical and pneumatic systems.

Still another advantage to the present invention is that it provides a data base containing both ongoing test information and an archive of past test information which may be accessed at any time.

The invention is adapted for use in testing virtually every commercial jet aircraft engine made today. The above advantages, and others, will become more apparent upon consideration of the following description in conjunction with the accompanying drawings.

BRIEF DESCRIPTION OF THE DRAWINGS

In the drawings, like reference numerals, letters and legends refer to like parts throughout the various views, and wherein:

FIG. 3 is a side elevational view of a typical engine build-up unit (EBU) and shows an engine suspended from a monorail system and a test station CRT, remotely connected to the test station, suspended adjacent the engine;

FIG. 4 is a side elevational view of the 5-bay console shown in FIG. 1;

FIG. 5 is a side elevational view of the first bay in the console shown in FIG. 4;

FIG. 6 is a view like FIG. 5, but shows the second bay in the console;

FIG. 7 is a view like FIGS. 5-6 but shows the third bay;

FIG. 8 is a view like FIGS. 5-7 but shows the fourth bay;

FIG. 9 is a view like FIGS. 5-8 but shows the fifth bay;

FIGS. 10-13 are to be taken together and show the operative interconnections between the various components making up the test station, wherein line breaks on the right-hand side of FIG. 10 correspond to like line breaks on the left-hand side of FIG. 11, and likewise from left to right for FIGS. 11, 12 and 13 in sequence;

BEST MODE FOR CARRYING OUT THE INVENTION

Introduction

Figure 1:
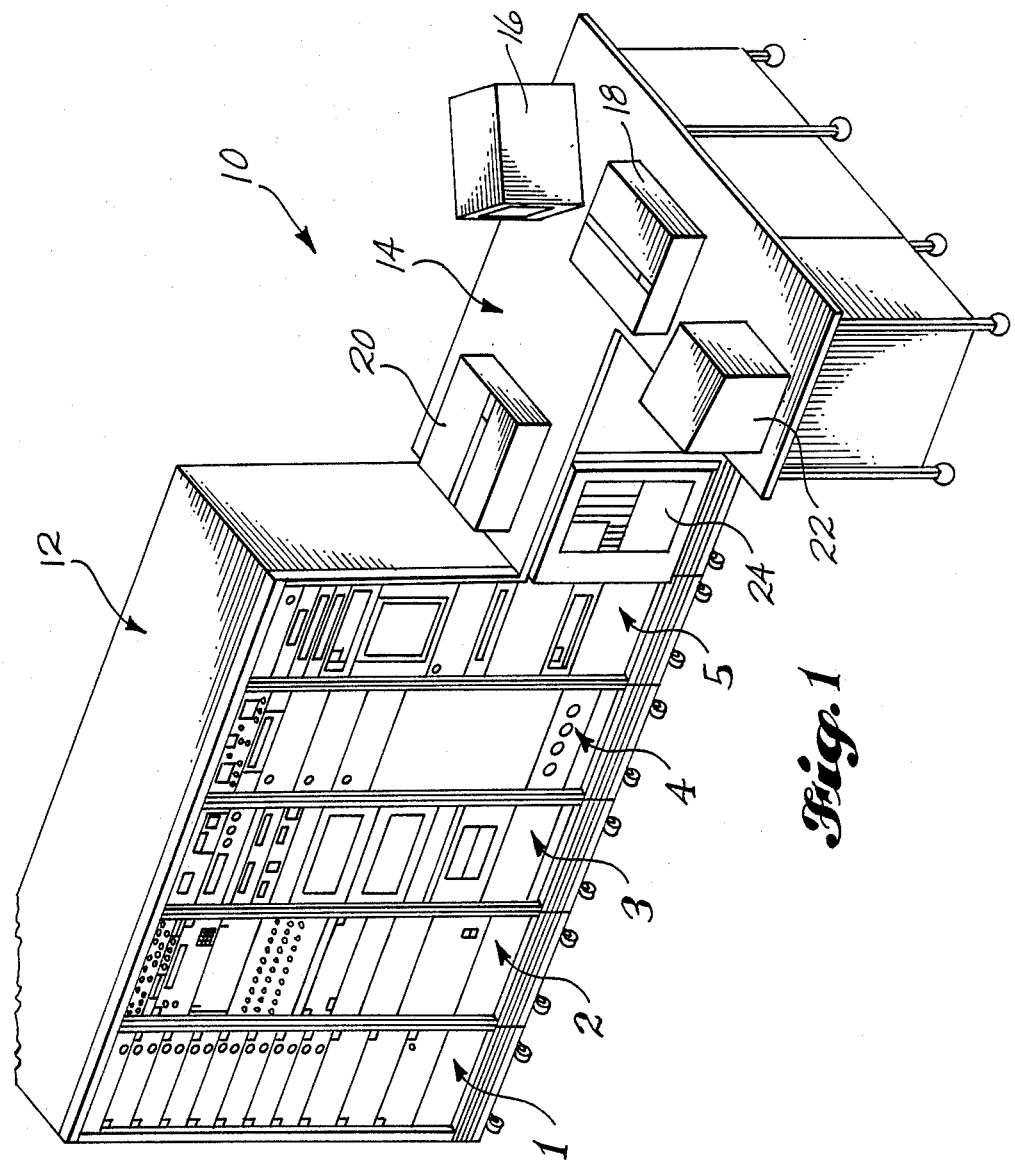
FIG. 1 is a pictorial view of a test station constructed in accordance with a preferred embodiment of the invention, and shows a 5-bay console connected to an L-shaped bench.
Figure 2:
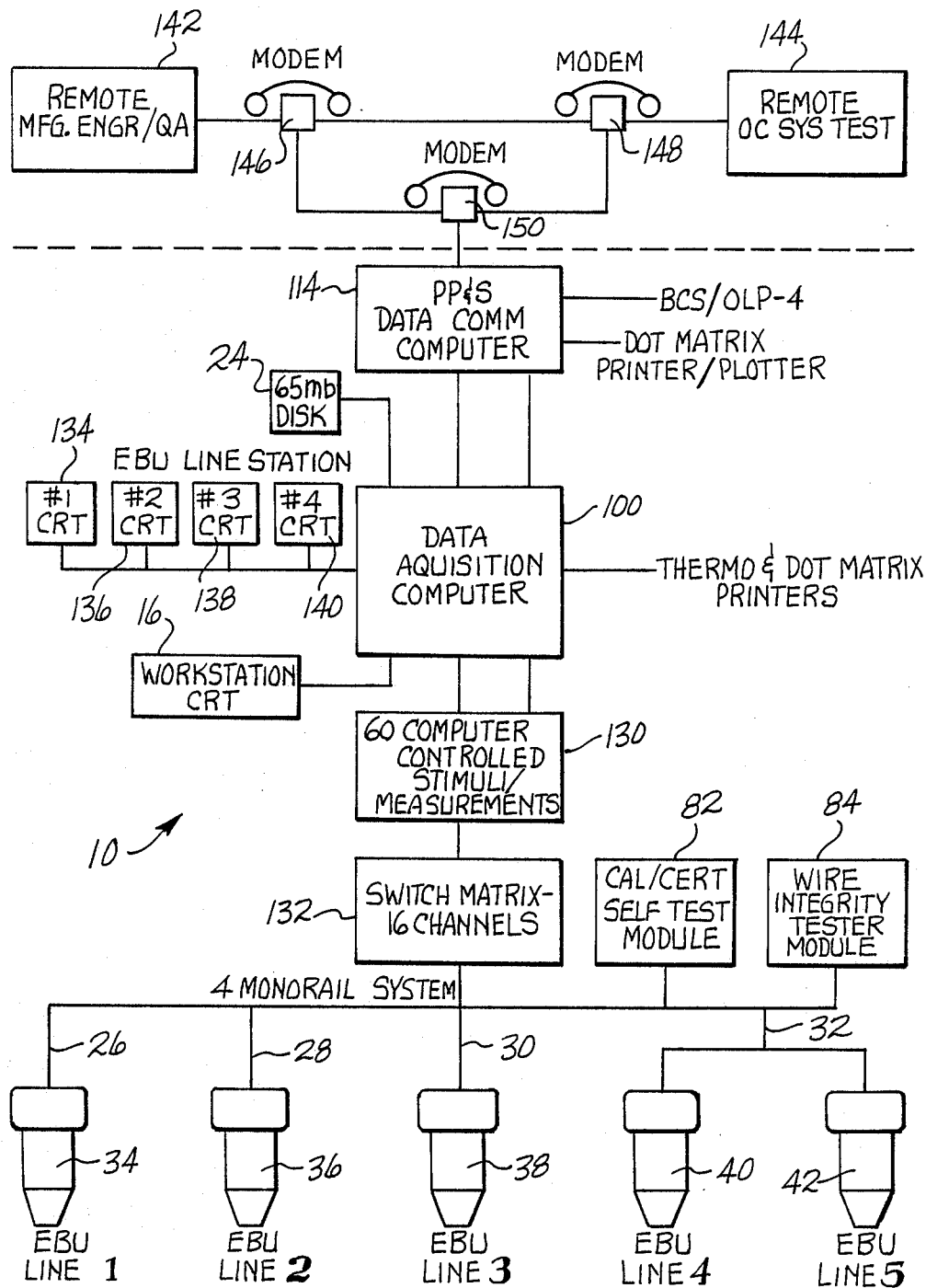
FIG. 2 is a schematic block diagram illustrating the invention.
Figure 11:
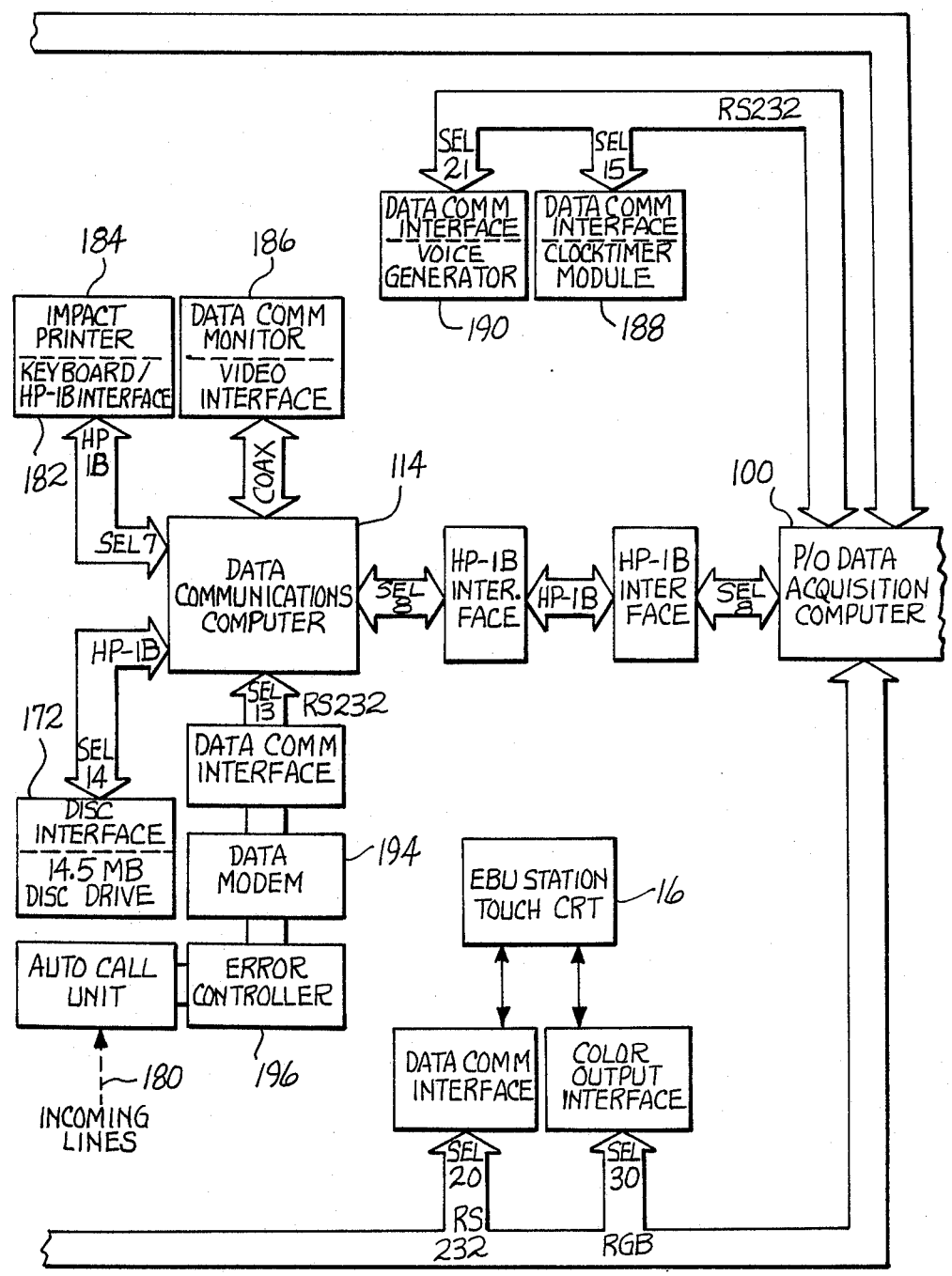
Figure 12:
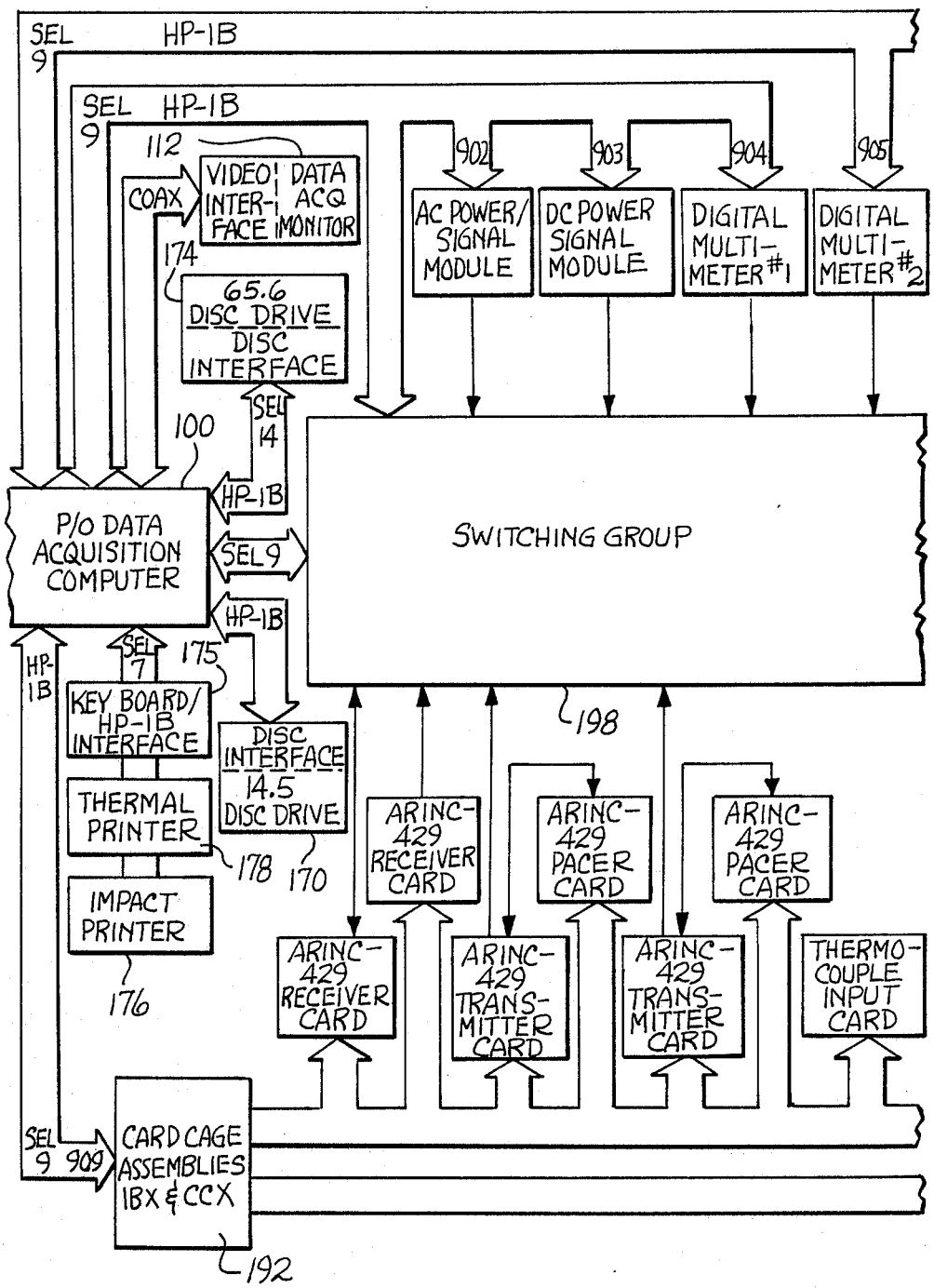
Figure 13:
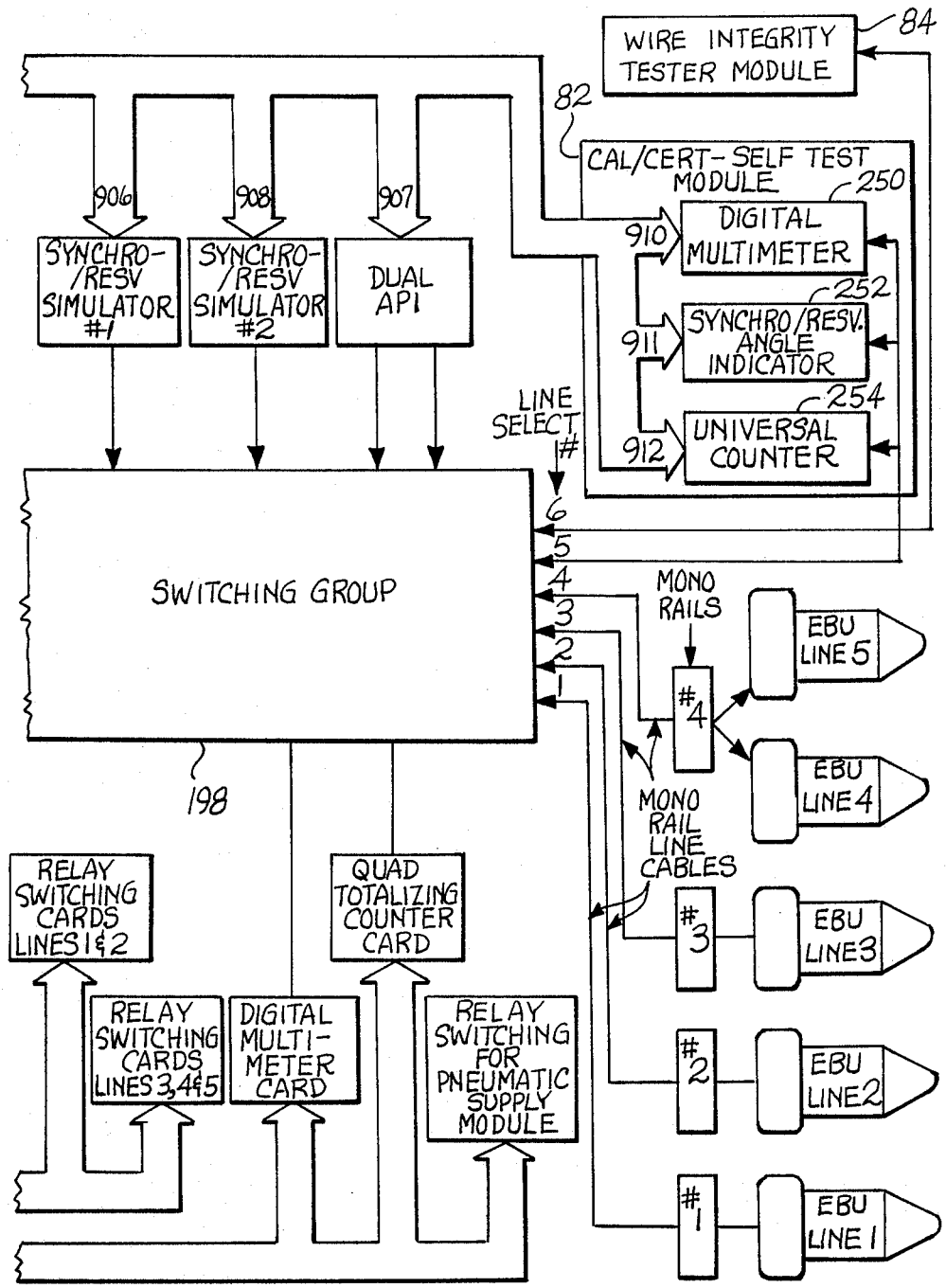

Referring now to the drawings, and first to FIG. 1, therein is shown at 10 a test station constructed in accordance with the invention. FIG. 2 schematically shows the physical and functional layout of the station 10.

The station 10 includes a 5-bay console 12 and an attached L-shaped bench 14. The console's bays are generally indicated or numbered by reference numerals 1 to 5, beginning at the console's left end. Bays 1 and 2 contain switching equipment while bays 3, 4 and 5 contain control, power supply and test function stimuli and function measurement equipment, respectively. Test station equipment on the bench 14 includes a conventional touch monitor 16, dual-mode printers 18, 20, a conventional CRT monitor 22 and a hard disk drive 24.

Referring briefly to FIG. 2, four monorail line cables 26, 28, 30, 32, respectively, connect the test station 10 to the locating jig (LJ) boxes of engines 34, 36, 38, 40, 42 or engine build-up (EBU) line stations under test. FIG. 3 shows the engine indicated at 34 in FIG. 2 under test. The engine 34 is suspended from one monorail 44 in a multi-line monorail system, which would be familiar to a person skilled in the art. Connecting cable 26 connects the test station 10 to the engine 34, and to a remote test station communication terminal or CRT 46, which will be further described later.

Referring now to FIGS. 4-9, Console bay No. 1 (see FIG. 5) contains eight upper modules 48 that include sixteen Matrix No. 2 channel switches. Three lower modules 50 consist of Matrix No. 1 group switches.

Bay No. 2 (see FIGS. 4 and 6) contains a system power supply module 52 having an alarm supervisory panel, and also contains a matrix control assembly 54, a matrix drive assembly 56, a patch panel 58, containing both an instrument function interface panel and a switch channel interface panel, two Matrix No. 3 function switches 60, and an accessory service panel indicated at 62. The bottom two panels 64, 66 in bay 2 are blanks.

Console bay No. 3 (see FIGS. 4 and 7) contains an AC power/signal module 68, a DC power/signal module 70, a DC power/signal module interface panel 70, two digital multimeter modules 72, a synchro/resolver simulator module 74, a dual-channel API (angle position indicator) module 76, two card cage assemblies 78, 80, a cal/cert (calibration/certification) self-test module 82, the latter consisting of a synchro/resolver angle position indicator, a digital multimeter, and a universal counter. The module 84 immediately below module 82 is a wire integrity tester module. Blank panels 86, 88 are included immediately below and above the wire integrity tester module 84 and the AC power/signal module 68, respectively.

Bay No. 4 (see FIGS. 4 and 8) contains a station power module 90, a digital clock/timer module 92, a data acquisition module 94, a pneumatic supply module 96, and a voice generator module 98. The data acquisition module 94 further contains the test station's data acquisition computer 100 (see also FIG. 2) and two data input/output expanders 102, 104.

Bay No. 5 (see FIGS. 4 and 9) contains another accessory service panel 106, a modem module 108, a data communications disc drive module 110, a data acquisition monitor module 112, a data communications computer 114, and a keyboard 116 therefore, a thermal printer 118, and a data acquisition disc drive module 120. The modem module 108 further includes an error controller 122, an autocall unit 124, and a data modem 126. Included in the data communications computer module 114 is an HP-1B interface, a composite video card, a data communications interface, and a disk interface. These latter components are of a conventional nature and would be familiar to a person skilled in the art. The lower panel 128 of bay 5 is a blank panel.

The test station is schematically shown in FIG. 2. The station 10 includes the capability for providing sixty computer controlled stimuli for test of engine electrical and pneumatic systems, and means for measuring response to the same, as indicated at 130. A switch matrix 132 having sixteen channels provides switching capability for the computer's control of stimuli/measurements. The data acquisition computer 100 is programmed to control stimuli and measurements and to create data indicating the same. Data may be output to the test station user by either thermo and dot matrix printers, or the work station CRTs 134, 136, 138, 140 positionable adjacent each EBU line station 34, 36, 38, 40, 42, in the manner shown in FIG. 3. The data communications computer 114 is operatively connected to the data acquisition computer 100. The data computer 100 has archive capability and stores any data created by the data acquisition computer. The data in the data communications computer 114 is accessible by other test station users at remote locations as indicated at 142 and 144, respectively. Each of these remote locations 142, 144 may, for example, be in the form of conventionally known CRT's connected to the data communication computer 114 by modems 146, 148, 150.

The above-described components are of a conventional nature and would be familiar to a person skilled in the art. In the following description, various components will be identified by maker model number. FIGS. 10-15 show their functional interrelationships and how they would be connected together. Special programming was developed for the data acquisition computer 100 and the data communications computer 114, which is included as Appendix A and B hereto, respectively. All of this information, in combination with the following description of the test station, would enable a person skilled in the art to practice the invention.

The description of the station 10 which follows in parts I-IV below divides the test station into four operating groups of equipment: A control group, a switching group, a power supply group, and a stimuli/measurement group. These groups will now be individually described and reference is now drawn to FIGS. 10-15.

I. Control Group

The control group consists of equipment that enables the test station operator or user 115 to start and control test programs. Two separate computer systems, one for data acquisition and the other for data communications 110, 114, provide the means to automatically control functional test operations locally from the test station itself, or remotely from prime division support organizations 142, 144 that are equipped with the proper interface modems 146, 148, 150.

The data acquisition computer 100 and its peripheral equipment are the central controller of the test station 10. Preferably, this computer is an HP Model 9920S (hereafter the acronym "HP" denotes the tradename Hewlett-Packard). The acquisition computer 100 sends application software program commands to the stimulus and measurement equipment 130 by means of a switching group in bay 1, and processes data gathered. Programmable stimulus and measurement equipment are selectively addressed by their own device addresses (select codes [SEL]) which are shown in FIGS. 10-13. A 14.5 megabyte Winchester/floppy disk drive 170 and a 65 megabyte hard disk/tape drive 174 provide ample storage capabilities and flexibility. The computer keyboard 175 and the data acquisition monitor 112 enables the station operator to insert and view data, inputs, results, program listings, error messages, and system comments. Impact and thermo printers 176, 178 are attached for printing hard copies if desired. Various interfaces are installed in the computer's accessory slots to interface with the peripheral equipment and other instruments. They convert equipment signals to computer compatible characters and vice versa, and maintain line protocol, all of which is conventional.

The following interfaces (with their select code [SEL] numbers) are installed in the rear accessory slots of the data acquisition computer 100:

1. HP 98624A HP-1B Interface—SEL 9; drives all instruments in bays 1-3.
2. HP 98204B Composite Video Interface; drives data acquisition monitor.
3. HP 98624A HP-IB Interface—SEL 8; drives data communication computer HP-IB interface.
4. Keyboard/HP-IB Interface—SEL 7; drives thermal and impact printers and graphics plotter.
5. HP 98625A Disk Interface—SEL 14; drives 14.5 and 65.6 megabyte disk drives.
6. Mainframe Interface for HP 9888A I/O Expander.
7. Mainframe Interface for HP 9888A I/O Expander.

As a person skilled in the art would know, the data acquisition computer cited above has sixteen accessory slots. Because of the large amount of peripherals and other equipment in the present invention, more accessory slots are needed. Therefore, two additional input-/output bus expanders (HP Model 9888A) are used to increase the computer's interfacing capability to allow a total of thirty-two additional card slots for the computer 100. The following interfaces (with their select code [SEL] numbers) are installed in the rear accessory slots of the upper (PC 753) I/O expander:

1. HP 98627A Color Output Interface—SEL 22; drives Line 1 EBU CRT.
2. HP 98627A Color Output Interface—SEL 24; drives Line 2 EBU CRT.
3. HP 98627A Color Output Interface—SEL 26; drives Line 3 EBU CRT.
4. HP 98627A Color Output Interface—SEL 28; drives Line 4 EBU CRT.
5. HP 98627A Color Output Interface—SEL 30; drives Station EBU CRT.
6. And 8 are blank
7. Expander Interface Card Assembly The following interfaces (with their select code [SEL] numbers) are installed in the rear accessory slots of the lower (PC 754) I/O expander:

1. HP 98628A Datacomm Intfc Opt 001 Async/-DL—SEL 15; drives clock/timer module.
2. HP 98628A Datacomm Intfc Opt 001 Async/-DL—SEL 16; drives Line 1 EBU CRT.
3. HP 98628A Datacomm Intfc Opt 001 Async/-DL—SEL 17 drives Line 2 EBU CRT.
4. HP 98628A Datacomm Intfc Opt 001 Async/-DL—SEL 18; drives Line 3 EBU CRT.
5. HP 98628A Datacomm Intfc Opt 001 Async/-DL—SEL 19; drives Line 4 EBU CRT.
6. HP 98628A Datacomm Intfc Opt 001 Async/-DL—SEL 20; drives Station EBU CRT.
7. Blank
8. HP 98628A Datacomm Intfc Opt 001 Async/-DL—SEL 21; drives voice generator module.
9. Expander Interface Card Assembly.

The 14.5 megabyte disk drives (HP Model 9133XV) 170, 172 contain a 3½ in. double-sided flexible (floppy) disk drive and a 5¼ in. Winchester fixed (hard) disk drive. The floppy disks in each disk drive 170, 172 are used for temporary file transfer and scratch pad writing uses. The hard disk in the data acquisition computer 100 is used for executive software and as temporary functional test files of the file being run. The hard disk in the data communications computer 114 is used as permanent storage of all current functional test application software (sub-programs).

The 65.6 megabyte disk drive (HP Model 7912) 174 contains a 5¼ in. Winchester fixed (hard) disk drive and a tape drive that uses a DC 600 type preformatted data cartridge providing 67 megabytes (600 ft.) of storage. The hard disks are used for storage of all database programs. The tapes are used to provide back-up storage for information on the disks.

The impact printer (HP Model -2934A) 176 provides hard copy printout capability for the data acquisition computer 100. This particular printer offers 200 character-per-second bidirectional printing, last-form tearoff, programmable page and text length, easy forms handling, bar code and large character generation, letter-quality printing at 67 cps, and increased letter-quality printing at 40 cps.

The thermal printer 178 (HP Model 2673A) is an intelligent graphics printer that features full 128 USASCII, roman extension, and line drawing character sets. the printer 178 also has autocentering, windowing, offsets, expanded characters 5 cpi, high density printing, and framing.

Print features and formatting are selected via the control panel, and stored in the printer's nonvolatile memory. Once selected, features come up automatically at printer power-on. Escape sequence commands from the host turn features on or off without altering the setting in the memory.

The data acquisition monitor 112 (HP Model 35721A) provides real time visual display of selected computer operations. The monitor 112 has a nonglare 14 in. screen and an 80-character by 24-line video display.

The data communications computer 114 (HP Model 9920S) and its peripheral equipment are the communications controller. This computer 114 may be used to communicate with locations remote from the test station as indicated at 180. All current functional test application software (subprograms) are resident in the data communications computer's 14.5 megabyte hard disk drive 172. These tests are transferred to the data acquisition computer 100 on demand. This computer 114 is operatively connected to a communications monitor 186. The keyboard 182 and monitor 186 enable the test station user to insert and view data. The impact printer 184 may be used for printing hard copies if desired.

The following interfaces (with their select code [SEL] numbers) are installed in the rear accessory slots of the data communications computer 114:

1. HP 98624 A HP-IB Interface—SEL 8; drives data acquisition computer HP-IB interface.

2. And 8 are blank.

3. HP 98625A Disc Interface—SEL 14; drives 14.5 megabyte disc drive.

4. Keyboard/HP-IB Interface—SEL 7; drives impact printer.

5. HP 98628A Datacomm intfc Opt 001 Async/-DL—SEL 21; drives modem module.

6. HP 98204B Composite Video Interface; drives data communications monitor.

As indicated in FIG. 2, the test station 10 has the capability of servicing five engine build-up (EBU) line stations 34, 36, 38, 40, 42. Four line station CRTs 134, 136, 138, 140 are provided in the test station to enable station operator input at each CRT, in the manner shown in FIG. 3. Each CRT touch unit 134, 136, 138, 140 consists of a 13 in. analog color monitor (AYDIN Model 8810) equipped with a screen mounted industrial touch unit (Carroll Model 8000-6400). An additional station 16 is on the L-shaped bench 14. The other four 134, 136, 138, 140 are at the test end of the EBU lines 34, 36, 38, 40. One CRT may be used to test two EBU stations 40, 42, if desired. The color monitor utilizes basic television receiver design principles to produce a raster-scan display. The monitor accepts external sync and separate red, green, and blue video signal inputs formatted in accordance with EIA standard RS-170. The touch unit enables the station operator to enter commands or respond to prompting by touching the face of the CRT at the appropriate point on the displayed picture.

The digital clock/timer 188 (Chrono-log Model K-22111-2432) provides a means of generating a time and date reading at any desired point in the program. In addition, single or multiple interrupts can be generated at accurately timed intervals. The clock/timer can also be used as a timer of test station tasks and as a precision alarm clock.

The voice generator 190 (Speech Plus Model PR2020) provides the test station with the capability to output desired information in an intelligible voice or produce warning tones. Because it uses synthesis-by-rule algorithms instead of stored speech, the voice generator has an unlimited vocabulary. The generator's input is plain english text in ASCII form and the output is normal-sounding speech. Abbreviations and symbols are automatically expanded to generate speech that sounds like that which one would expect from a speaker. Although not really necessary, pitch, amplitude, speech rate, and other speech attributes can take advantage of a versatile assortment of control commands to meet special needs. The voice generator 190 also has a programmable signal generator which can produce nonspeech sounds. This generator is for applications that require tones for status or warning signals. Pitch, duration, timbre, and output amplitude may be varied. Silence, extended tones or multiple tone sequences can also be generated.

The card cage assembly 192 (CDS Model 53A-IBX) is a bus instrument that provides direct connection to the data acquisition computer 100 through this computer's IEEE-488 I/O port. The assembly 192 is a card cage completely interfaced to the data acquisition computer 100 and contains the following "instrument-on-a-card" modules, all of which would be familiar to a person skilled in the art:

1. . One communications card 53A-127 which allows the system to function as a programmable instrument on any IEEE-488 bus.

2. One control card 53A-171 which identifies system level commands, provides address control, initiates timing signals, checks system cards for interrupts and reports vectored priority interrupts to the computer.

3. Two power supplied 53A-060 which provide 5 volt power to all slots in the card cage assembly.

4. One power supply 53A-062 which provides ±15 volt power to all slots in the card cage assembly.

5. One chaining card 53A-145 which connects the IEEE-488 bus instrument card cage assembly to the chained card cage assembly 53A-CCX through its communications card.

6. Two presorting ARINC-429 receiver cards 53A-420 receive data from the digital information transfer system and reformat the data into 8-bit bytes for retransmission to the computer.

7. Four universal ARINC-429 transmitter/pacer cards 53A-421/423. Two are used as 53A-421 transmitter cards which transmit data to DITS, the digital information transfer system. The computer outputs 8-bit bytes to the card which reformats the data into 32-bit serial words for the DITS bus. The transmitter card has RAM that can store up to sixty-four messages and retransmit the messages at preprogrammed time intervals which are controlled by the two pacer cards (53A-423). The pacer cards also allow programming the data bit rates to be transmitted.

The card cage assembly 192 also includes a chained card cage assembly (CDS Model 53A-CCX) which provides direct connection to the bus instrument card cage assembly. This latter assembly is completely interfaced to the bus instrument card cage and contains the following "instrument-on-a-card" modules:

1. One communications card 53A-123 which allows data transfer rates up to 500,000 ASCII characters per second to the computer.

2. One control card 53A-171 which functions the same as the one in the bus instrument card cage.

3. Two power supplies 53A-060 which provide 5 volt power to all slots in the card cage assembly.

4. One power supply 53A-062 which provides 15 volt power to all slots in the card cage assembly.

5. One thermocouple input card 53A-225 which provides ten input channels. Measurements may be taken at a maximum of 15 readings per second.

6. Six relay switching cards 53A-351 which provide ten independently controlled dpdt relays that sustain 100 switchings per second with a minimum 4 ms dwell time.

7. One digital multimeter card 53A-522 which is a 4½-digit, 15 readings per second, guarded, dual slope integrating systems multimeter with four programmable measurement functions--dc voltage, true rms ac voltage, and 2- or 4-wire ohms.

8. One quad totalizing counter card 53A-540 which provides four independent, ten-digit totalizing counters with adjustable input thresholds. Events can be counted at a rate of up to five million events per second. Also, the card has four memories, ten digits deep to facilitate "reading on the fly".

The data modem 194 (UDS Model 208A/B) is a high-speed, synchronous data communications unit with a primary data rate of 4800 bits per second that operatively links the data communications computer 114 to the remote off-site locations 180. Major functions center on a high-speed microprocessor which accepts the digital data to be transmitted, synthesizes a modulated carrier, and transmits it to a telephone line. An autocall unit (UDS 801 ACU) is included for permitting a data terminal to establish calls through the telephone network. Calls can be completed using either pulse or DTMF (tone) dialing methods as selected by the user or by the ACU in response to line conditions. An error controller 196 (UDS-EC-100) provides error correction for uncontrolled data terminal equipment.

II. Switching Group

Figure 14:
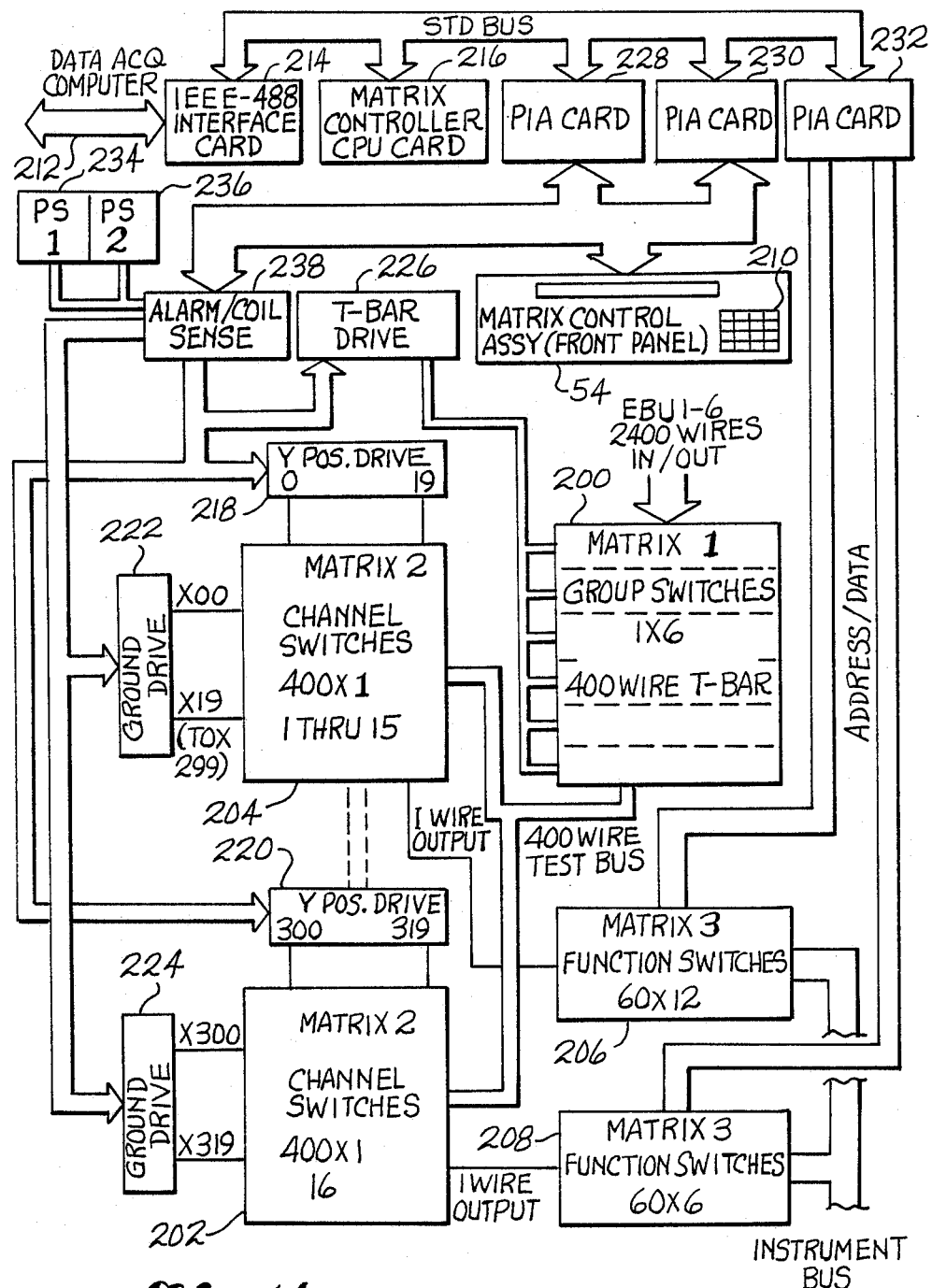
FIG. 14 is a schematic block diagram showing the operative interconnections of the various components making up a switching group portion of the test station.

Referring now to FIG. 14, the switching group 198 consists of a matrix control assembly 54, matrix drive assembly 56, matrix number one group switches 200, matrix number two channel switches 202, 204, matrix number three function switches 206, 608, the system power supply module 52, and patch panel 58.

The switching group 198 is a multifunctional system used to monitor eleven performance and diagnostic characteristics used in jet engine testing. The signals switched range from DC to five kilohertz AC. Group equipment may be controlled either remotely via commands sent over the IEEE-488 bus from the data acquisition computer 100, or locally via the keypad on the matrix control assembly 54.

Switching is divided into three basic matrices, as shown in FIG. 14: Matrix No. 1, as indicated at 200, are the group switches which provide both switching of six 400-wire inputs from the particular unit under test (UUT) to Matrix No. 2. Matrix No. 2, as indicated at 202, 204, are the channel switches which provide 1-wire switching by sixteen 400 by 1 matrices between Matrices No. 1 and No. 3. Matrix No. 3, as indicated at 206, 108, are the function switches which also provide 1-wire switching by three 60 by matrices between Matrix No. 2 and external instruments.

The primary function of the switching system 198 is to switch signals between sources and sinks using either instructions sent over an IEEE-488 bus or manually. The matrix control assembly 54 controls the switching matrices 200, 202, 204, 206, 208 through a resident microprocessor operating from a program stored in EPROM on its CPU card. The matrix control assembly 54 controls several functions including processing incoming data, to check the accuracy and availability of the signal path selected, and to operate the appropriate relays used to connect inputs to outputs. The operational instructions to direct the operations can come remotely from the data acquisition computer 100 or locally and manually from the resident keypad 210 on the front panel of the matrix control assembly.

Control instructions, sent over the IEEE-488 bus by the data acquisition computer 100, as indicated at 212, are accepted by the IEEE-488 interface card 214. This card performs the "hand shaking" function on the bus and accepts control information when addressed. The control data received is sent to the microprocessor on the CPU card 216 where a series of checks are made. These checks include: Accuracy of data received, and condition of the input and output line to be selected to prevent prohibited operations. Once these checks have been completed, the microprocessor allows the addressed relays to operate in the specified matrices. Four resident positive drive cards, schematically indicated at 218, 220, respectively, and four ground drive cards indicated at 222, 224, respectively, provide some of the latch and unlatched pulses to Matrix No. 2. The remaining twelve positive assembly 56. One resident T-bar drive card 226 provides latch and unlatch pulses to Matrix No. 1. Switching in Matrices No. 1 and No. 2 is performed on a conventional BREAK before MAKE pattern.

Control instructions may also be sent from the keypad 210 to the microprocessor via the peripheral interface adapter cards 228, 230, 232 where the same checks and results will happen as mentioned above. Fault conditions detected will result in a report to the microprocessor which interprets the problem and displays an appropriate message on the front panel and on the data acquisition computer video monitor 112. An asterix (*) is sent to the controller 54 indicating successful operation of the matrix when the service request (SRQ) is OFF. Otherwise, an SRQ (25) is issued. A forty-character display on the matrix control assembly's front panel 54 identified function, channel, wire number and engine locations.

The matrix drive assembly 56 contains the remaining twelve positive drive and twelve ground drive cards required to drive the Matrix No. 2 mercury relays.

The Matrix No. 1 group switches consists of the group switches that provide bulk switching of the six 400-wire inputs from the UUTs to Matrix No. 2. The group switches are conventional T-bar relays. Four of the input sets (monorail line cables select No. 1–No. 4, corresponding to 26, 28, 30, 32 in FIG. 2, respectively) are from the four monorails of EBU line stations 34, 36, 38, 40, 42. The fifth input (select No. 5) is from the cal/cert self-tests module 82 which is resident and hard-wired into the test station 10. The sixth input (select No. 6) is from the wire integrity tester module 84 which is also resident and hard-wired into the test station.

The Matrix No. 2 channel switches consist of the channel switches that provide a 1-wire switching between Matrices No. 1 and No. 3 by Matrix No. 2's 16 by 400 matrices. The channel switches are mercury-wetted, nonlatching relays designed for large current-carrying capacity, long life, and low contact resistance.

Figure 15:
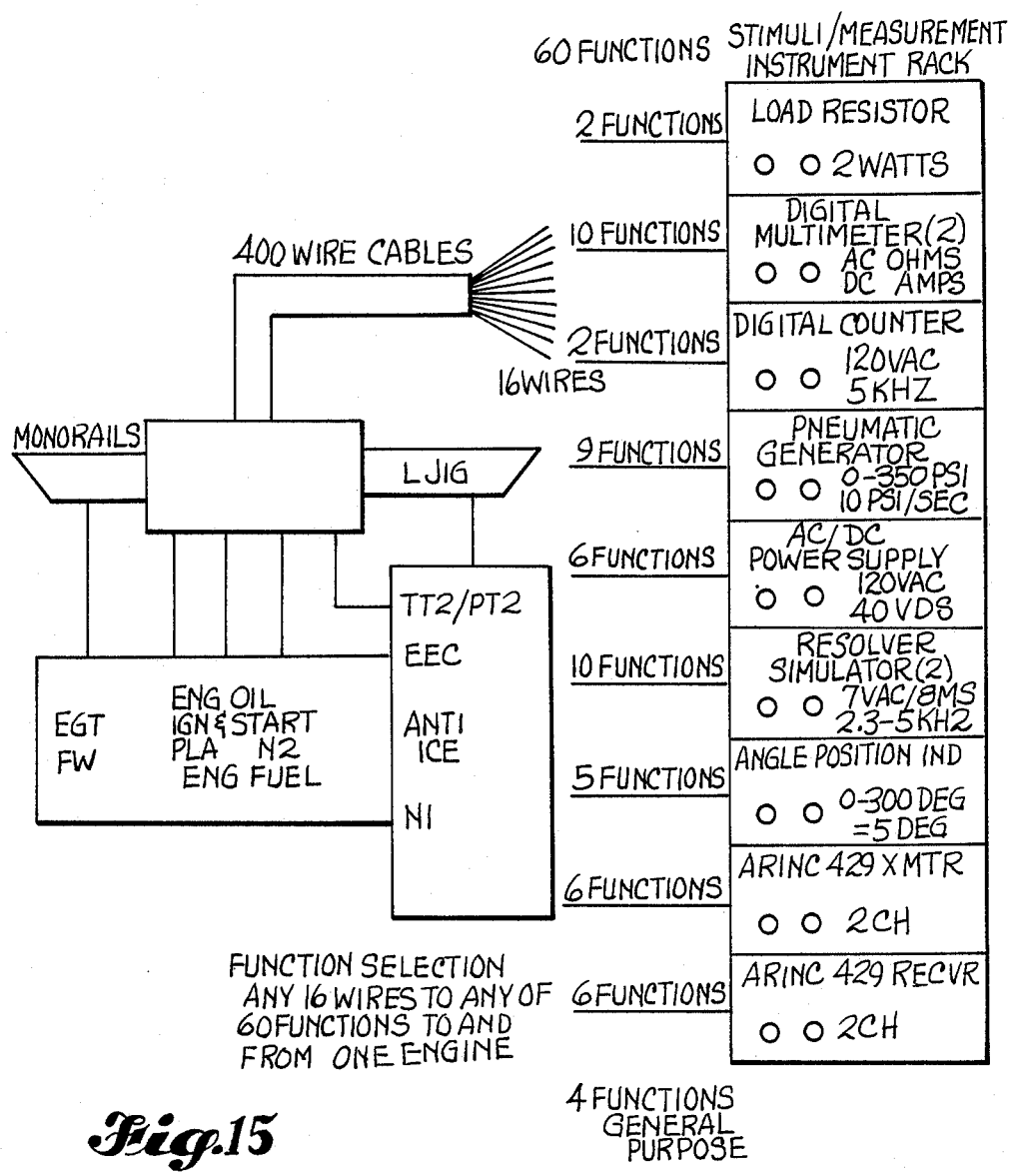
FIG. 15 is a schematic diagram showing engine functions or systems tested by the test station.

The Matrix No. 3 function switches consist of the function switches that provide 1-wire switching between Matrix No. 2 and external instruments by Matrix No. 3's three 60 by 6 matrices. The function switches are the same type relays as Matrix No. 2. FIG. 15 illustrates a typical (one of four) EBU monorail configuration and the sixty functions provided by the test station 10, and selectable at the stimuli/measurement equipment (instrument) rack.

The system power supply 52 consists of switching power supplies No. 1 and No. 2, as indicated at 234, 236, respectively, and an alarm supervisory module 238. The two identical power supplies 234, 236 provide output voltages of 5, 12 and 24 volts DC, which are required by the switching group 198. One power supply is a back-up to reduce the possibility of switching group failure. The alarm supervisory module 238 monitors power supply operation and provides test jacks to monitor output levels.

The patch panel 58 consists of dedicated five-way banana jacks connected to all sixty functions and sixteen channels as shown in the stimuli/measurement instrument rack shown in FIG. 15. The panel 58 can be used for debugging test station functions. It is intended to be used to isolate problems for repair so that EBU operators can quickly determine if a fault is at an engine or in the test station 10. The patch panel 58 is also potentially useful for special engineering tests, if desired. The panel's rear has ZIF (zero insertion force) connectors for interfacing to the various station instruments and matrices No. 2 and No. 3. Double banana jacks with shorting caps are used to isolate instrument functions from Matrix No. 1, and Matrix No. 2 (engine wires) from Matrix No. 3. The following list, set forth in Table A below, identifies conventional patch panel harness pin assignments.

TABLE A

| FUNCT# | INSTRUMENT | HOOK UP | CONNECTOR | PIN |
|---|---|---|---|---|
| F1 | VAC_S1 | AC PWR SENSE + | P101 | 1A |
| F2 | VAC_H | AC PWR HIGH | P101 | 2A |
| F3 | VAC_L | AC PWR LOW | P101 | 3A |
| F4 | VAC_S2 | AC PWR SENSE − | P101 | 4A |
| F5 | VDC_S1 | DC PWR SENSE + | P101 | 5A |
| F6 | VDC_H | DC PWR HIGH | P101 | 6A |
| F7 | VDC_L | DC PWR LOW | P101 | 7A |
| F8 | VDC_S2 | DC PWR SENSE − | P101 | 8A |
| F9 | DMM1_S1 | DMM #1 SENSE + | P101 | 1B |
| F10 | DMM1_H | DMM #1 HIGH | P101 | 2B |
| F11 | DMM1_L | DMM #1 LOW | P101 | 3B |
| F12 | DMM1_S2 | DMM #1 SENSE − | P101 | 4B |
| F13 | DMM2_S1 | DMM #2 SENSE + | P101 | 5B |
| F14 | DMM2_H | DMM #2 HIGH | P101 | 6B |
| F15 | DMM2_L | DMM #2 LOW | P101 | 7B |
| F16 | DMM2_S2 | DMM #2 SENSE − | P101 | 8B |
| F17 | GND_C | CHASSIS GROUND | P101 | 1C |
| F18 | COUNTER_H | COUNTER HIGH | P101 | 2C |
| F19 | COUNTER_L | COUNTER LOW | P101 | 3C |
| F20 | GND_E | ENGINE GROUND | P101 | 4C |
| F21 | ARINCT1_H | ARINC #1 TX HI | P101 | 5C |
| F22 | ARINCT1_L | ARINC #1 TX LO | P101 | 6C |
| F23 | ARINCT1_S | ARINC #1 TX SH | P101 | 7C |
| F24 | FUTURE | EXPANSION | P101 | 8C |
| F25 | ARINCR1_H | ARINC #1 RC HI | P101 | 1D |
| F26 | ARINCR1_L | ARINC #1 RC LO | P101 | 2D |
| F27 | ARINCR1_S | ARINC #1 RC SH | P101 | 3D |
| F28 | FUTURE | EXPANSION | P101 | 4D |
| F29 | ARINCT2_H | ARINC #2 TX HI | P101 | 5D |
| F30 | ARINCT2_L | ARINC #2 TX LO | P101 | 6D |
| F31 | ARINCT2_S | ARINC #2 TX SH | P101 | 7D |
| F32 | FUTURE | EXPANSION | P101 | 8D |
| F33 | ARINCR2_H | ARINC #2 RC HI | P101 | 1E |
| F34 | ARINCR2_L | ARINC #2 RC LO | P101 | 2E |
| F35 | ARINCR2_S | ARINC #2 RC SH | P101 | 3E |
| F36 | RES1_S1 | RESOLVER #1 S1 | P101 | 4E |
| F37 | RES1_S2 | RESOLVER #1 S2 | P101 | 5E |
| F38 | RES1_S3 | RESOLVER #1 S3 | P101 | 6E |
| F39 | RES1_R1 | RESOLVER #1 R1 | P101 | 7E |
| F40 | RES1_R2 | RESOLVER #1 R2 | P101 | 8E |
| F41 | RES2_S1 | RESOLVER #2 S1 | P101 | 1F |
| F42 | RES2_S2 | RESOLVER #2 S2 | P101 | 2F |
| F43 | RES2_S3 | RESOLVER #2 S3 | P101 | 7F |

TABLE A-continued

PATCH PANEL HARNESS PIN ASSIGNMENTS

| FUNCT# | INSTRUMENT | HOOK UP | CONNECTOR | PIN |
|---|---|---|---|---|
| F44 | RES2_R1 | RESOLVER #2 R1 | P101 | 8F |
| F45 | RES2_R2 | RESOLVER #2 R2 | P101 | 1G |
| F46 | FUTURE | EXPANSION | P101 | 2G |
| F47 | API_S1 | ANGLE POS S1 | P101 | 7G |
| F48 | API_S2 | ANGLE POS S2 | P101 | 8G |
| F49 | API_S3 | ANGLE POS S3 | P101 | 1H |
| F50 | API_R1 | ANGLE POS R1 | P101 | 2H |
| F51 | API_R2 | ANGLE POS R2 | P101 | 7H |
| F52 | LOAD_H | LOAD RESISTOR+ | P101 | 8H |
| F53 | LOAD_L | LOAD RESISTOR− | P101 | 1J |
| F54 | FUTURE | EXPANSION | P101 | 2J |
| F55 | FUTURE | EXPANSION | P101 | 7J |
| F56 | FUTURE | EXPANSION | P101 | 8J |
| F57 | FUTURE | EXPANSION | P101 | 1K |
| F58 | FUTURE | EXPANSION | P101 | 2K |
| F59 | FUTURE | EXPANSION | P101 | 3K |
| F60 | FUTURE | EXPANSION | P101 | 4K |

III. Power Supply Group

The power supply group basically includes those units which provide general operational power to the test station 10. They are the station power module 90 and the accessory service panel 106. This group does not include the built-in power supplies that are resident in many of the equipment units or the variable AC and DC supplies used to provide stimuli and measurement signals.

The station power module 90 consists of two identical digital volts/amperes monitors (Electro Industries Model VA100N), a hour meter and various indicator lights, switches and jacks. Besides 115 volts AC operating power, the monitors require inputs of the currents and voltages to be monitored. Internal circuitry converts the sense signals to digital readouts, which are displayed on the front panel of the station power module 90.

The accessory service panel 106 provides two 115 volt AC convenience outlets for connection of accessories or other test equipment.

IV. Stimuli/measurements Group

The stimuli/measurements group includes all the equipment used to simulate aircraft signals to the unit under test (UUT), as well as the equipment in the test station 10 used to measure all signal and response components necessary to insure the UUT and test station are performing correctly. This group includes the wire integrity module 84, the calibration certification self-test module 82, the pneumatic supply module 96, the DC power/signal module 68, the DC/power/signal interface module 70, two digital multimeter modules 72, the synchro/resolver simulator module 74 and the angle position indicator (API) module 76, which is dual channel.

The wire integrity tester module 84 (Boeing Model WIT-400) consists of 400 precision resistors connected in series. One hundred resistors are mounted on four-each lexan plastic cards by metal five-way binding posts. A dedicated wire is connected to each post from four ZIF connectors mounted at the rear of the module. When connected to the resident digital multimeter, each dedicated wire will have a precise resistance. Internal switch tests may be accomplished by using group switch No. 3 to connect the tester through the internal switch matrix to the resident digital multimeters for integrity test of the switch matrix system and harnesses. Cable tests may be accomplished by using a 100 conductor test cable (like a spare arterial cable) connected from the tester module to the end cable at the strut/engine interface and this will provide integrity tests of each arterial cable for debug and replacement maintenance.

The calibration/certification self-test module 82 is used to perform self-tests on the test station 10, to calibrate and certify the accuracy of the functional tests performed by the equipment. Three instruments mounted in the module 82 are calibrated frequently and used as standards for other instruments and measurements. These instruments are a digital multimeter 250 (Fluke Model 8840A) a synchro/resolver angle indicator 252 (ILC/DDC Model HSR-203), and a universal counter 254 (HP Model 5316A).

The digital multimeter 250 measures true RMS AC voltage, DC voltage, current, and resistance with three reading rates. The multimeter 250 measures diagnostic self-tests, which check both the digital and analog circuitry in the multimeter. The synchro/resolver angle indicator 252 is used for production testing of synchros and resolvers, and will accept either synchro or resolver data and provide output data formatted to BCD angle information. The universal counter 254 measures signals over a range of DC to 100 megahertz. The counter measures frequency, period, time interval, time interval average, time interval holdoff (delay), and ratio. A totalized function with manual or external gating is also provided. All measurements except totalize are shown in engineering notation with up to eight digits of resolution.

The pneumatic supply module 96 is conventional and provides air pressure for the monorail solenoids that connect pressure hoses to engine test ports.

The AC power/signal module 68 (HP Model 6034A) is an interface bus programmable unit that provides laboratory grade performance with high efficiency of switching regulation techniques. Auto ranging allows the supply to provide at least 200 watts output power over a wide range of output voltage and current combinations without the user having to select the proper output range. Output voltage and current are continuously indicated on individual meters. LED indicators show the complete operating state of the unit. Overvoltage protection protects the user's load by quickly and automatically interrupting energy transfer if a preset trip voltage is exceeded.

The DC power/signal module interface panel 70 (Boeing Model No. HPVDC) consists of four test jacks wired to the back of the DC power/signal module. This particular unit brings the output voltages to the front of the cabinet for maintenance purposes.

The digital multimeter module 72 contains two identical units (Fluke Model 8840A) which are used for measurement of jet engine test parameters. The multimeters measure true RMS AC voltage, DC voltage, current, and resistance with three reading rates. As mentioned above, the multimeters feature diagnostic self-test which check both the digital and analog circuitry in the multimeter.

The synchro/resolver simulator module 74 contains two identical angle simulators (ILC/DDC Model SIM-31200) which incorporate microprocessor control of digital input multiplexing, front panel display, internal 20-bit digital to resolver converter and status/fault flag outputs. The angle input may be entered locally via the front panel keyboard 74, or remotely through the rear panel parallel data connector. The remote input format (BCD or binary) is selectable via a rear panel switch. The front panel keyboard is used for local programming of output formats increment-decrement, output voltage levels, angle entry and calibration/test functions.

Thus, the various components making up a test station 10 constructed in accordance with a preferred embodiment of the invention has been described. A person skilled in the art would appreciate that various changes could be made in the test station without departing from the spirit and scope of the invention. The required software programming for both the data acquisition computer 100 and the data communications computer 114 is incorporated herein by reference and accompanies this specification as Appendix A and B. It is to be appreciated that patent protection is not to be limited by the instant description of the invention, including any associated programming, but only by the subjoined claims, wherein such claims are to be interpreted in accordance with the well-established doctrines of patent claim interpretation.

What is claimed is:

1. For use in connection with a jet aircraft engine having certain electrical and pneumatic systems including oil and fuel pressure transducers, engine igniters, and EEC computer, air bleed valves, air-operated starter and thermo/anti-ice valves, and certain solenoids, a test station for automatically performing on-ground tests of such electrical and pneumatic systems when said engine is in a static, nonrunning condition, such station comprising:
   a programmable data acquisition computer;
   input means, controllable by said computer, and operable to provide a certain test stimulus to any one of said electrical and pneumatic systems;
   output means, operatively connected to said computer, for sensing response of said any one of said systems to said test stimulus, in a manner so that computer may generate test data indicative of such response; and
   wherein said computer includes programming means operable by a test station user for permitting said user to select said certain test stimulus and to cause said computer to control said input means in accordance with said selected stimulus, and further, said programming means being operable by said user to control generation of test data by said computer, such data indicating system response to said test stimulus.

2. The test station of claim 1, wherein said input and output means may be simultaneously connected to each of a plurality of jet aircraft engines, each engine having said electrical and pneumatic systems, and wherein said programming means is user-operable to permit said user to select a certain test stimulus for the electrical and pneumatic systems of any one of said jet aircraft engines, and to cause said computer to control said input means in accordance with the same.

3. The test station of claim 2, including a remote communication terminal positioned adjacent each jet aircraft engine, wherein each terminal is operatively connected to said data acquisition computer, said terminal being operable to receive test instructions from a test station user and to communicate said instructions to said programming means in said computer, said programming means being further operable to cause said remote terminal to acknowledge said instructions and to request certain other instructions from said user.

4. The test station of claim 3, wherein each remote communication terminal includes voice generator means for providing computer verbalization, in a user-audible manner, of both said remote terminal's acknowledgment of instructions and request for other instructions.

5. The test station of claim 1, including a remote communication terminal positioned adjacent each jet aircraft engine, wherein each terminal is operatively connected to said data acquisition computer, said terminal being operable to receive test instructions from a test station user and to communicate said instructions to said programming means in said computer, said programming means being further operable to cause said remote terminal to acknowledge said instructions and to request certain other instructions from said user.

6. The test station of claim 5, wherein each remote communication terminal includes voice generator means for providing computer verbalization, in a user-audible manner, of both said remote terminal's acknowledgment of instructions and request for other instructions.

* * * * *

UNITED STATES PATENT AND TRADEMARK OFFICE
CERTIFICATE OF CORRECTION

PATENT NO. : 4,821,217

DATED : April 11, 1989

INVENTOR(S) : Brian K. Jackson and Joel D. Wilson

It is certified that error appears in the above-identified patent and that said Letters Patent is hereby corrected as shown below:

Column 1, line 26, there should be a period after "airplane".

Column 1, line 59, there should be a period after "systems".

Column 6, line 4, "HP-1B" should be -- HP-IB --.

Column 7, line 42, after "a", insert:

-- keyboard 182, an impact printer 184, and a data --

Column 9, line 23, after "provides", insert -- $\pm$ --.

Column 10, line 15, after "60 by", insert -- 6 --.

Column 10, line 49, after "positive", insert:

-- drive and twelve ground drive cards are in the matrix drive --.

Claim 1, column 16, line 1, after "that", insert -- said --.

Signed and Sealed this

Twenty-seventh Day of February, 1990

*Attest:*

JEFFREY M. SAMUELS

*Attesting Officer*  *Acting Commissioner of Patents and Trademarks*